Feb. 6, 1962 K. A. SLUZ 3,019,447
APPARATUS FOR DOUCHING THE ANUS
Filed Dec. 10, 1958
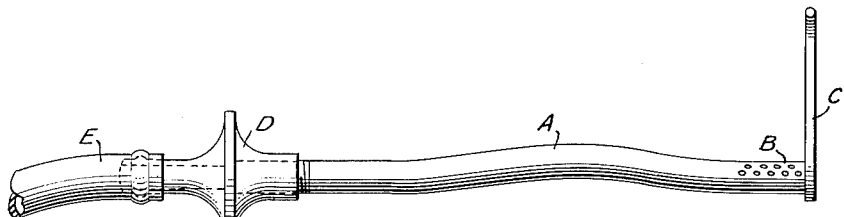
Fig. 1
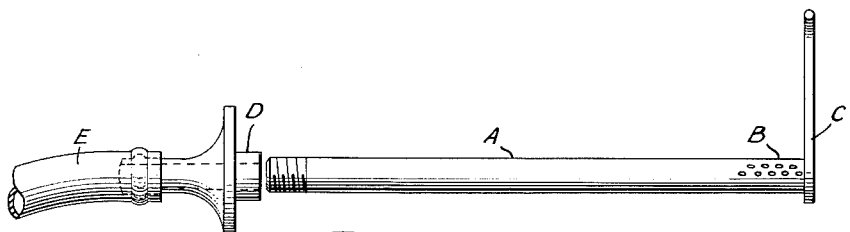
Fig. 2
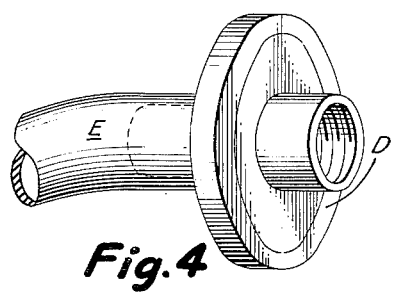
Fig. 4
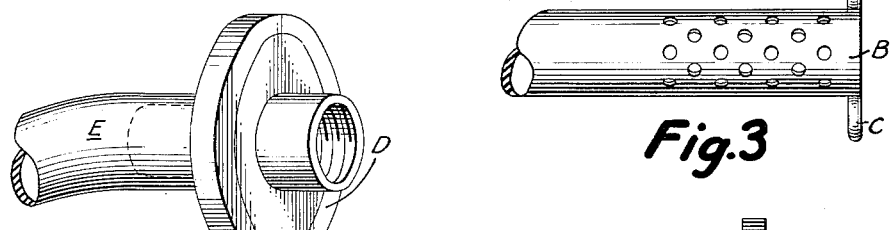
Fig. 3
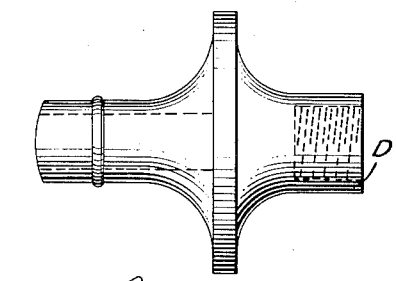
Fig. 5
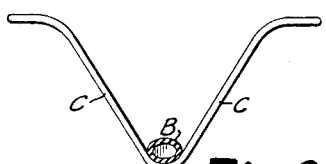
Fig. 6
Fig. 7
Fig. 8
INVENTOR
Konstantin A. Sluz United States Patent Office 3,019,447
Patented Feb. 6, 1962

3,019,447
APPARATUS FOR DOUCHING THE ANUS
Konstantin A. Sluz, Canberra, Australia
(% F. Kovaleff, 242 8th Ave., San Francisco, Calif.)
Filed Dec. 10, 1958, Ser. No. 779,380
1 Claim. (Cl. 4—7)

The purpose of the apparatus

Despite the progress in all fields of our standard of living and particularly the improvements in the field of hygiene through the centuries there have been no changes in the method of cleaning the anus. People used to clean the anus with leaves or paper and to this day the same method remains except that the paper is manufactured softer for this purpose.

As it is obvious that with neither paper nor even with a wet rag it is possible to clean as thoroughly this important part of our body as with sprays of water, this apparatus is the simplest and easiest way to do it and will assist with personal hygiene with the minimum of effort and time, as well as without the touch of hand.

The following is the full description of the invention related to the accompanying drawing, of which:

FIG. 1 shows a side view of the apparatus in which the nozzle A between plug D and holes B is curved.

FIG. 2 shows a side view of the apparatus in which nozzle A between plug D and holes B is straight.

FIG. 3 shows the end of the nozzle in plan with holes B and points of the feelers C attached.

FIG. 4 shows plug D connecting the nozzle by means of a plastic pipe or rubber hose E with the source of water.

FIG. 5 shows a side view of plug D.

FIGS. 6, 7, 8 are sections of nozzle A near the sealed end showing three different cross-sections of the nozzle and different angles of deviation of the C feelers below at their joining the A body of the nozzle and also at the top where the C feelers will touch the flesh.

The description of the apparatus

The apparatus is a nozzle A sealed at one end. At the sealed end there are several small holes to allow fine jets of water to come through (FIG. 1—B holes).

Also at the same end of nozzle A feelers are attached (FIG. 1—C feelers) which act as guides in contact with buttocks to space the nozzle and prevent the end of the nozzle (tube) from touching the flesh and permit a spray of water to wash the buttocks.

The other end of the nozzle is attached or screwed on to a connecting plug. This plug (FIG. 1—connecting plug D) is connected by means of a flexible rubber hose or a plastic pipe (FIG. 1—E rubber hose or plastic pipe) with the source of hot and cold water.

The nozzle A can be made of ebony, plastic, celluloid, metal or any other material including waterproof oil paper for individual usage thereof in public lavatories, and can be of various sizes and of various suitable cross-sections. For children, of course, the nozzle must be made smaller than for adults.

The shape of the nozzle will depend on the form of the seat of the water closet pan installed in the house. The seat with the opening in front requires a straight nozzle (FIG. 2) whereas a complete round seat requires a curved nozzle (FIG. 1).

The number of holes in the nozzle may be increased or decreased according to the size of the nozzle.

The angles of deviation of the C feelers at the base as well as at the top may be different (FIGS. 6–8).

The process of using the apparatus

After excretion the person, whilst remaining on the water closet pan in the same position, directs the nozzle of the apparatus between the legs and touches the buttocks with the feelers to put the nozzle into the right position and turns on the faucet of the water source.

The strong jets of water clean the anus thoroughly. Having tidied himself the person then turns off the faucet, takes out the nozzle and cleans it by rinsing.

The claim defining the invention is as follows:

A douching device comprising a pipe-like nozzle sealed at one end, and having a series of small holes through the wall of the nozzle for a limited portion of the circumference thereof and adjacent the sealed end, two spacing feeler guides attached to the nozzle at opposite sides thereof at the sealed end, and diverging therefrom on the same side as the holes, with the holes therebetween, to space the nozzle from the user's body and to permit the passage of a liquid as a spray, and a connecting means on the opposite open end of the nozzle for the supply of the liquid thereto.

References Cited in the file of this patent

UNITED STATES PATENTS 1,838,356    Berry _____ Dec. 29, 1931